(12) United States Patent  (10) Patent No.: US 11,907,239 B2
Ito  (45) Date of Patent: Feb. 20, 2024

(54) INFORMATION PROCESSING APPARATUS AND NON-TRANSITORY COMPUTER READABLE MEDIUM STORING COMPUTER PROGRAM

(71) Applicant: FUJIFILM Business Innovation Corp., Tokyo (JP)

(72) Inventor: Yasuhiro Ito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 524 days.

(21) Appl. No.: 16/892,301

(22) Filed: Jun. 4, 2020

(65) Prior Publication Data

US 2021/0200752 A1  Jul. 1, 2021

(30) Foreign Application Priority Data

Dec. 27, 2019  (JP) .................................. 2019-237802

(51) Int. Cl.
*G06F 16/248*  (2019.01)
*G06N 5/04*  (2023.01)
*G06F 3/0482*  (2013.01)

(52) U.S. Cl.
CPC ............. *G06F 16/248* (2019.01); *G06N 5/04* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 8,117,177 B2 | 2/2012 | Suzuki et al. | |
| 10,042,896 B2 | 8/2018 | Sun | |
| 10,097,973 B2 * | 10/2018 | Gross | H04W 4/50 |
| 10,185,762 B2 * | 1/2019 | Hu | G06F 16/90324 |
| 10,706,098 B1 * | 7/2020 | Ramesh | G06F 16/58 |
| 10,757,552 B2 * | 8/2020 | Gross | H04W 4/025 |
| 10,827,330 B2 * | 11/2020 | Gross | H04M 1/72469 |
| 10,935,389 B2 * | 3/2021 | Brush | G01C 21/3617 |
| 11,614,336 B2 * | 3/2023 | Brush | G06F 16/24575 707/706 |
| 2009/0182957 A1 | 7/2009 | Yashiro | |
| 2010/0088307 A1 | 4/2010 | Watanabe | |

(Continued)

FOREIGN PATENT DOCUMENTS

| | | |
|---|---|---|
| JP | 2007193697 | 8/2007 |
| JP | 2008250385 | 10/2008 |

(Continued)

OTHER PUBLICATIONS

"Office Action of Japan Counterpart Application", dated Oct. 10, 2023, with English translation thereof, pp. 1-9.

*Primary Examiner* — Kim T Nguyen
(74) *Attorney, Agent, or Firm* — JCIPRNET (57) ABSTRACT

An information processing apparatus includes a processor configured to predict a condition to be subsequently input by a user from an input condition that is a condition of a search input by the user, search for a content based on the input condition and a prediction condition obtained by prediction, and execute a process of presenting details of the search of the content based on the prediction condition in a case where the content is not found in the search based on the input condition.

20 Claims, 8 Drawing Sheets

(56) References Cited

U.S. PATENT DOCUMENTS

| | | | | |
|---|---|---|---|---|
| 2015/0269163 | A1* | 9/2015 | Sun | G06F 16/24578 |
| | | | | 707/728 |
| 2016/0360336 | A1* | 12/2016 | Gross | H04W 4/025 |
| 2019/0158994 | A1* | 5/2019 | Gross | H04W 4/025 |
| 2020/0304972 | A1* | 9/2020 | Gross | H04M 1/72403 |
| 2021/0200752 | A1* | 7/2021 | Ito | G06F 16/242 |
| 2021/0223059 | A1* | 7/2021 | Brush | G01C 21/3673 |
| 2022/0414492 | A1* | 12/2022 | Jezewski | G06Q 10/0633 |
| 2023/0168099 | A1* | 6/2023 | Brush | G01C 21/3476 |
| | | | | 707/706 |

FOREIGN PATENT DOCUMENTS

| | | |
|---|---|---|
| JP | 2009169688 | 7/2009 |
| JP | 2009277071 | 11/2009 |
| JP | 2010009615 | 1/2010 |
| JP | 2010086455 | 4/2010 |
| JP | 2017050814 | 3/2017 |
| JP | 2017508214 | 3/2017 |

\* cited by examiner

INFORMATION PROCESSING APPARATUS AND NON-TRANSITORY COMPUTER READABLE MEDIUM STORING COMPUTER PROGRAM

CROSS-REFERENCE TO RELATED APPLICATIONS

This application is based on and claims priority under 35 USC 119 from Japanese Patent Application No. 2019-237802 filed Dec. 27, 2019.

BACKGROUND

(i) Technical Field

The present invention relates to an information processing apparatus and a non-transitory computer readable medium storing a computer program.

(ii) Related Art

For example, JP2017-508214A discloses a method including acquiring a first search word input provided by a user, matching the first search word to at least one keyword on a list in order to select the at least one keyword from the list in which each keyword on the list corresponds to at least one search recommendation, and acquiring one or more search recommendations corresponding to the at least one keyword.

SUMMARY

In a content management system that manages contents such as document data, in a case where a content matching a condition input by a user is not found, the user may perform a search by changing the condition. However, even in a case where the condition is changed, the user may not find an intended content. In a case where the user may not find the intended content, the user performs the search by gradually changing the condition. However, the user does not have a motive for stopping the search and wastes time in searching.

Aspects of non-limiting embodiments of the present disclosure relate to an information processing apparatus and a non-transitory computer readable medium storing a computer program that can assist decision-making of a user related to continuing or stopping of a search of a content in a case where the user searches for the content.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to predict a condition to be subsequently input by a user from an input condition that is a condition of a search input by the user, search for a content based on the input condition and a prediction condition obtained by prediction, and execute a process of presenting details of the search of the content based on the prediction condition in a case where the content is not found in the search based on the input condition.

BRIEF DESCRIPTION OF THE DRAWINGS

Exemplary embodiment(s) of the present invention will be described in detail based on the following figures, wherein.

DETAILED DESCRIPTION

Hereinafter, one example of an exemplary embodiment of the present disclosure will be described with reference to the drawings. In each drawing, identical or equivalent constituents and parts are designated by identical reference signs. In addition, dimensional ratios in the drawings are exaggerated for convenience of description and may be different from actual ratios.

Figure 1:
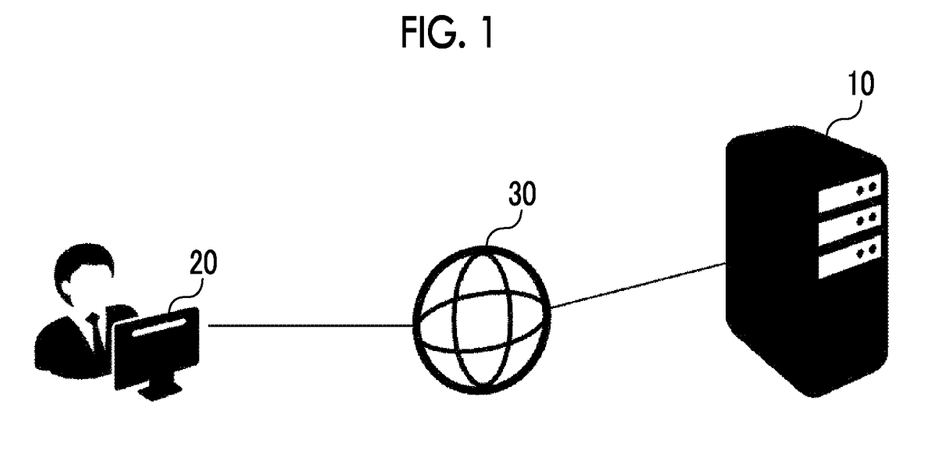
FIG. 1 is a diagram illustrating a schematic configuration of a content search system according to this exemplary embodiment.

FIG. 1 is a diagram illustrating a schematic configuration of a content search system according to this exemplary embodiment. The content search system illustrated in FIG. 1 is configured to include a search server 10 as an information processing apparatus and a user terminal 20. The search server 10 and the user terminal 20 are connected to each other through a communication line 30 such as the Internet or an intranet. The communication line 30 may be a wired line or a wireless line, and may be a dedicated line used by only a specific user or a public line in which the same line is shared by an unspecified number of users.

The search server 10 is an apparatus that searches for a content and returns a result of the search to the user terminal 20 in response to a request for searching for the content from the user terminal 20. A target of the content searched for by the search server 10 includes various electronic data such as image data, text data, document data, voice data, and motion picture data. The data as a target of the search performed by the search server 10 may be stored inside the search server 10 or may be stored in an apparatus outside the search server 10.

The user terminal 20 is a terminal used by a user of the content search system and may be any terminal such as a desktop computer, a laptop personal computer, a tablet, or a smartphone. The user terminal 20 is an apparatus configured to be capable of communicating with the search server 10 through the communication line 30. The user terminal 20 includes an input apparatus such as a mouse, a keyboard, and a microphone and an output apparatus such as a display and a speaker. The user terminal 20 causes the search server 10 to search for the content under a search condition input by the user using the input apparatus. The user terminal 20 outputs the result of the search of the search server 10 using the output apparatus.

In this exemplary embodiment, the search server 10 provides a user interface for searching for the content to the user terminal 20. The search server 10 executes the search of the content based on a search condition input in the user interface in the user terminal 20 by the user. The result of the search performed by the search server 10 may not be intended by the user. For example, in a case where the user instructs the search server 10 to perform the search by inputting "2019 specification document" in a file name as the search condition, the search server 10 may not find a content of which the file name includes "2019" or "specification document".

In a case where the search server 10 may not find the content matching the search condition input by the user, the user may perform the search by changing the condition. However, even in a case where the condition is changed, the search server 10 may not find an intended content. In a case where the user may not find the intended content, the user performs the search by gradually changing the condition. However, the user does not have a motive for stopping the search and wastes time in searching.

Therefore, in a case where the content may not be found under the search condition input by the user, the search server 10 according to this exemplary embodiment predicts a search condition that is considered to be subsequently input by the user, and further executes the search of the content under the predicted condition. The search server 10 according to this exemplary embodiment presents the result of the search of the content under the predicted condition. Accordingly, the search server 10 according to this exemplary embodiment may assist decision-making of the user related to the search.

The content search system illustrated in FIG. 1 includes only one user terminal 20 but may include a plurality of user terminals 20. In addition, the content search system may include a plurality of search servers 10.

Figure 2:
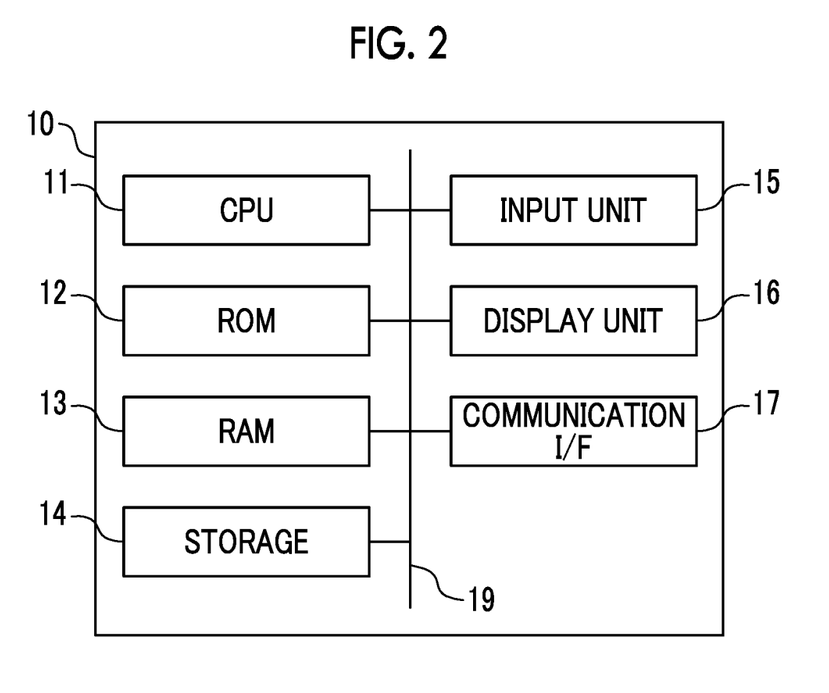
FIG. 2 is a block diagram illustrating a hardware configuration of a search server.

FIG. 2 is a block diagram illustrating a hardware configuration of the search server 10.

As illustrated in FIG. 2, the search server 10 includes a central processing unit (CPU) 11, a read only memory (ROM) 12, a random access memory (RAM) 13, a storage 14, an input unit 15, a display unit 16, and a communication interface (I/F) 17. These configurations are connected to be capable of communicating with each other through a bus 19.

The CPU 11 is a central processing unit and executes various programs or controls each unit. That is, the CPU 11 reads a program from the ROM 12 or the storage 14 and executes the program using the RAM 13 as a work region. The CPU 11 controls each configuration and performs various calculation processes in accordance with the program recorded in the ROM 12 or the storage 14. In this exemplary embodiment, the ROM 12 or the storage 14 stores a content search program for searching for the content.

The ROM 12 stores various programs and various data. The RAM 13 temporarily stores a program or data as the work region. The storage 14 is configured with a storage apparatus such as a hard disk drive (HDD), a solid state drive (SSD), or a flash memory and stores various programs including an operating system and various data.

The input unit 15 includes a pointing device such as the mouse and the keyboard, and is used for providing various inputs.

The display unit 16 is, for example, a liquid crystal display and displays various information. The display unit 16 may function as the input unit 15 by employing a touch panel type.

The communication interface 17 is an interface for communicating with another apparatus such as the user terminal 20 and uses standards such as Ethernet (registered trademark), FDDI, and Wi-Fi (registered trademark).

In the case of executing the content search program, the search server 10 implements various functions using hardware resources described above.

Next, a functional configuration of the search server 10 will be described.

Figure 3:
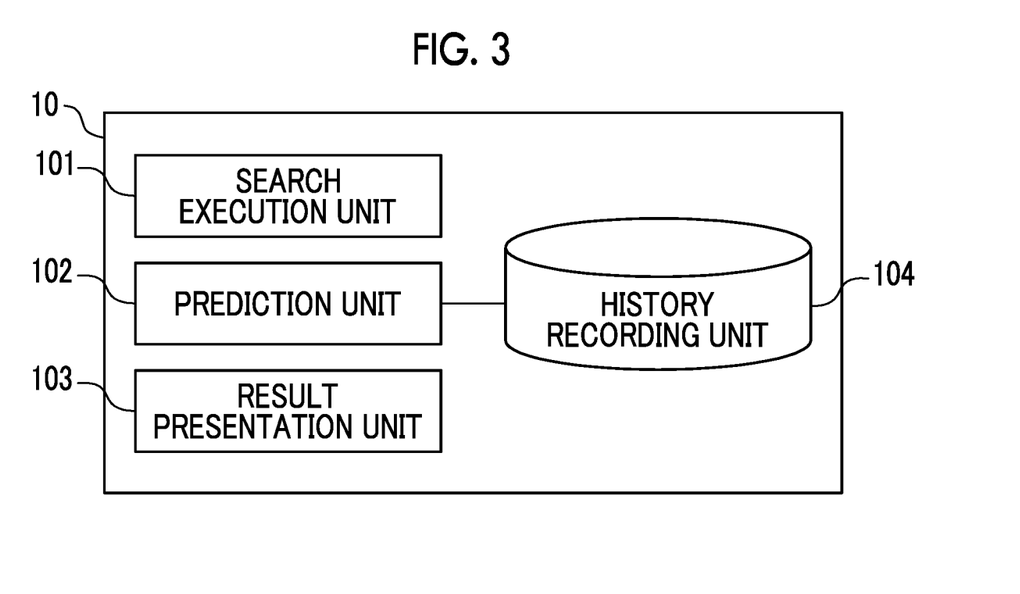
FIG. 3 is a block diagram illustrating an example of a functional configuration of the search server.

FIG. 3 is a block diagram illustrating an example of the functional configuration of the search server 10.

As illustrated in FIG. 3, as the functional configuration, the search server 10 includes a search execution unit 101, a prediction unit 102, and a result presentation unit 103. Each functional configuration is implemented by causing the CPU 11 to read and execute the content search program stored in the ROM 12 or the storage 14.

The search execution unit 101 executes the search of the content based on the search condition input in the user terminal 20 by the user with respect to a location at which the content is stored. Hereinafter, the location at which the content is stored will be referred to as a "search target". In addition, the search condition input by the user will be referred to as an "input condition". The input condition input by the user includes a search phrase and an attribute. For example, in a case where the file name of the content is designated in the attribute and "specification document" is input in the search phrase, the search execution unit 101 searches for whether or not a content including the phrase "specification document" in the file name of the content is present in the search target. The input of the input condition performed by the user is performed on the user interface provided by the search server 10. Examples of the user interface provided by the search server 10 will be described later.

In addition, the search execution unit 101 executes the search of the content based on a prediction condition decided by the prediction unit 102.

The prediction unit 102 predicts the condition considered to be subsequently input by the user from the input condition provided by the user and decides the predicted condition as the prediction condition. The prediction condition decided by the prediction unit 102 is used in a search process performed by the search execution unit 101. For example, the prediction unit 102 sets a phrase similar to the phrase designated in the input condition and the attribute designated in the input condition as the prediction condition. In addition, the prediction unit 102 sets the phrase designated in the input condition and an attribute similar to the attribute designated in the input condition as the prediction condition. In addition, the prediction unit 102 sets the phrase similar to the phrase designated in the input condition and the attribute similar to the attribute designated in the input condition as the prediction condition.

For example, in a case where the user inputs "2019" in the search phrase, the prediction unit 102 sets phrases similar to "2019", for example, phrases "2018", "2017", "first year of Reiwa", "31st year of Heisei", "30th year of Heisei", and "29th year of Heisei", as the prediction condition.

In addition, for example, in a case where "specification document" is input in the search phrase, the prediction unit 102 sets phrases similar to "specification document", for example, phrases "design document", "description document", and "report document", as the prediction condition.

The prediction unit 102 may decide the phrases similar to the search phrase using, for example, dictionary data in which data of synonyms is stored. In addition, for example, the prediction unit 102 may decide the phrases similar to the search phrase using a co-occurrence relationship between words. In addition, for example, the prediction unit 102 may decide the phrases similar to the search phrase using a search history recorded in a history unit 104. The search history may be a history of the user logging in to the content search system or a history of another user. In addition, for example, the prediction unit 102 may decide the phrases similar to the search phrase using a word that frequently appears at a location at which the content as the search target is stored.

In addition, for example, in a case where a personal name is input using kanji in the search phrase, the prediction unit 102 sets personal names similar to the personal name, for example, a personal name to which the personal name is changed by one text, a personal name represented as a hiragana name or a katakana name, and a personal name represented in romaji, as the prediction condition. For example, the prediction unit 102 may predict the personal names similar to the input personal name using registration information of the user registered in a system in which the content of the search target is managed.

In addition, for example, in a case where "creation date" is designated in the attribute, the prediction unit 102 sets attributes similar to "creation date", for example, attributes such as "update date", approval date", and "transmission date", as the prediction condition. For example, the prediction unit 102 may decide the attributes similar to the designated attribute using data related to attributes. Which attribute is to be used for the search depends on details of the content of the search target. Accordingly, the attribute to be used for the search is not limited to a specific attribute.

In the case of deciding the prediction condition, the prediction unit 102 may predict the attribute from the input search phrase. For example, in a case where the file name is designated in the attribute and "2019" is input in the search phrase, the prediction unit 102 may set an attribute designating a date in a search range of Jan. 1, 2019 to Dec. 31, 2019 as the prediction condition. For example, in a case where the file name is designated in the attribute and "2019" is input in the search phrase, the prediction unit 102 may decide the attribute designating the date such as "creation date", "update date", "approval date", and "transmission date" as the prediction condition. The prediction unit 102 may set the search range for the attribute to Jan. 1, 2019 to Dec. 31, 2019. In addition, in a case where "year of 2019" is input in the search phrase, the prediction unit 102 may set the range of the date to Apr. 1, 2019 to Mar. 31, 2020. In addition, in a case where "first half of 2019" is input in the search phrase, the prediction unit 102 may set the range of the date to Jan. 1, 2019 to Jun. 30, 2019 or Apr. 1, 2019 to Sep. 30, 2019. Information about the range of a fiscal year or a period may be prestored in the storage 14. In the case of deciding the range of the date, the prediction unit 102 may refer to the information about the range of the fiscal year or the period stored in the storage 14.

The result presentation unit 103 presents the result of the search of the content performed by the search execution unit 101 using the input condition and the prediction condition on the user terminal 20. In a case where a content matching each condition may be found, the result presentation unit 103 presents information related to the content on the user terminal 20. Meanwhile, in a case where the content matching each condition may not be found, the result presentation unit 103 presents information related to the condition under which the search is performed on the user terminal 20.

For example, in a case where the file name of the content is designated in the attribute and "2019" is input in the search phrase as the search condition, the search execution unit 101 searches for not only a content including "2019" in the file name but also a content including the phrases "2018", "2017", "first year of Reiwa", "31st year of Heisei", "30th year of Heisei", and "29th year of Heisei". In a case where the content using any of the phrases may not be found by the search execution unit 101, the result presentation unit 103 presents the inability to find the content corresponding to any of "2019", "2018", "2017", first year of Reiwa", "31st year of Heisei", "30th year of Heisei", and "29th year of Heisei" on the user terminal 20.

For example, in a case where the file name of the content is designated in the attribute and "specification document" is input in the search phrase as the search condition, the search execution unit 101 searches for not only a content including "specification document" in the file name but also a content including the phrases "design document", "description document", and "report document". In a case where the content using any of the phrases may not be found by the search execution unit 101, the result presentation unit 103 presents the inability to find the content corresponding to any of "specification document", "design document", "description document", and "report document" on the user terminal 20.

By having such a configuration, the search server 10 may predict the search condition considered to be subsequently input by the user and further execute the search of the content under the predicted condition. The search server 10 according to this exemplary embodiment may present the result of the search of the content under the predicted condition.

Accordingly, the search server 10 according to this exemplary embodiment may assist decision-making of the user related to the search in a case where the content matching the search condition input by the user may not be found.

Next, an effect of the search server 10 will be described.

Figure 4:
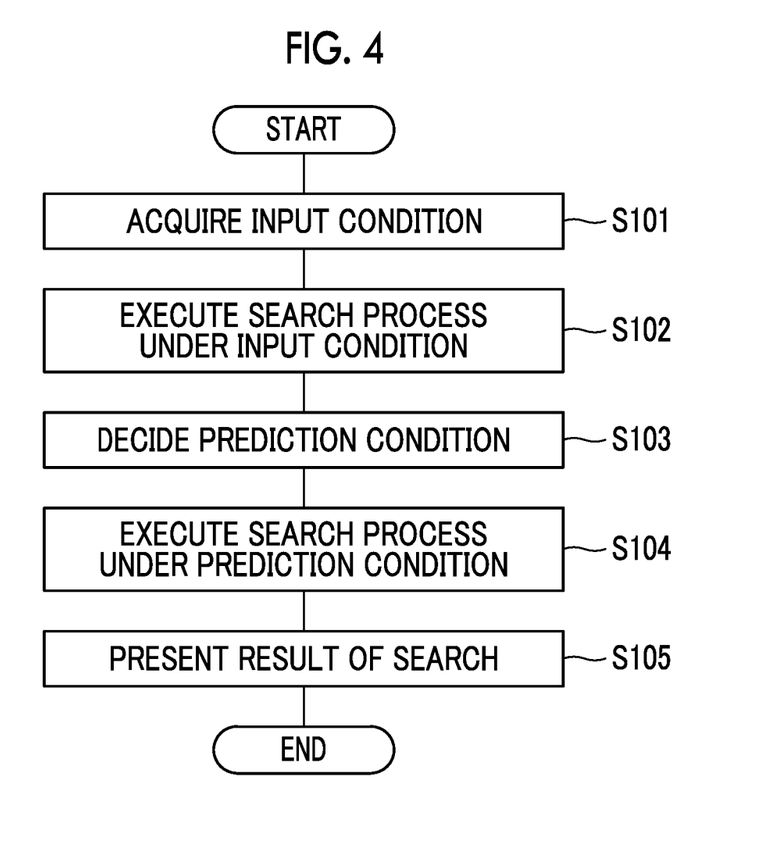
FIG. 4 is a flowchart illustrating a flow of content search process performed by the search server.

FIG. 4 is a flowchart illustrating a flow of content search process performed by the search server 10. The content search process is performed by causing the CPU 11 to read the content search program from the ROM 12 or the storage 14, load the content search program into the RAM 13, and execute the content search program.

The CPU 11 acquires the input condition input by the user from the user terminal 20 (step S101). The input of the input condition performed by the user is performed on the user interface provided by the search server 10. The input condition input by the user includes a search phrase and an attribute.

After step S101, the CPU 11 executes the search process based on the input condition (step S102). That is, the CPU 11 searches for the content matching the search phrase input by the user and the attribute designated by the user.

After step S102, the CPU 11 decides the prediction condition predicted from the input condition (step S103). Specifically, the CPU 11 predicts the condition considered to be subsequently input by the user from the input condition input in the user terminal 20 by the user and decides the predicted condition as the prediction condition.

After step S103, the CPU 11 executes the search process based on the prediction condition (step S104). For example, the search process based on the prediction condition is a process of searching for a content matching the phrases similar to the search phrase input by the user and the attribute designated by the user. In addition, for example, the search process based on the prediction condition is a process of searching for a content matching the search phrase input by the user and the attributes similar to the attribute designated by the user. In addition, for example, the search process based on the prediction condition is a process of searching for a content matching the phrases similar to the search phrase input by the user and the attributes similar to the attribute designated by the user.

In the flowchart illustrated in FIG. 4, the search process based on the prediction condition is executed after the search process based on the input condition is executed. Alternatively, the CPU 11 may execute the search process based on the input condition and the search process based on the prediction condition in parallel.

After step S104, the CPU 11 presents the result of the search processes based on the input condition and the prediction condition on the user terminal 20 (step S105). In a case where the content matching each condition may be found, the CPU 11 presents information related to the content on the user terminal 20. Meanwhile, in a case where the content matching each condition may not be found, the CPU 11 presents information related to the condition under which the search is performed on the user terminal 20.

As described above, in a case where the file name of the content is designated in the attribute and "2019" is input in the search phrase, the CPU 11 searches for not only a content including "2019" in the file name but also a content including the phrases "2018", "2017", "first year of Reiwa", "31st year of Heisei", "30th year of Heisei", and "29th year of Heisei". In a case where the content may not be found using any of the phrases, the CPU 11 presents the inability to find the content corresponding to any of "2019", "2018", "2017", "first year of Reiwa", "31st year of Heisei", "30th year of Heisei", and "29th year of Heisei" on the user terminal 20.

In addition, for example, in a case where "creation date" is designated in the attribute, the CPU 11 searches for the content using the attributes similar to "creation date", for example, attributes such as "update date", approval date", and "transmission date", as the prediction condition. In a case where the content may not be found using any of the attributes, the inability to find the corresponding content even in a case where "update date", "approval date", and "transmission date" are designated is presented on the user terminal 20.

By executing such a series of operations, the search server 10 may predict the search condition considered to be subsequently input by the user and further execute the search of the content under the predicted condition. The search server 10 according to this exemplary embodiment may present the result of the search of the content under the predicted condition. Accordingly, the search server 10 according to this exemplary embodiment may assist decision-making of the user related to the search in a case where the content matching the search condition input by the user may not be found.

Next, examples of the user interface provided to the user terminal 20 by the search server 10 will be described.

Figure 5:
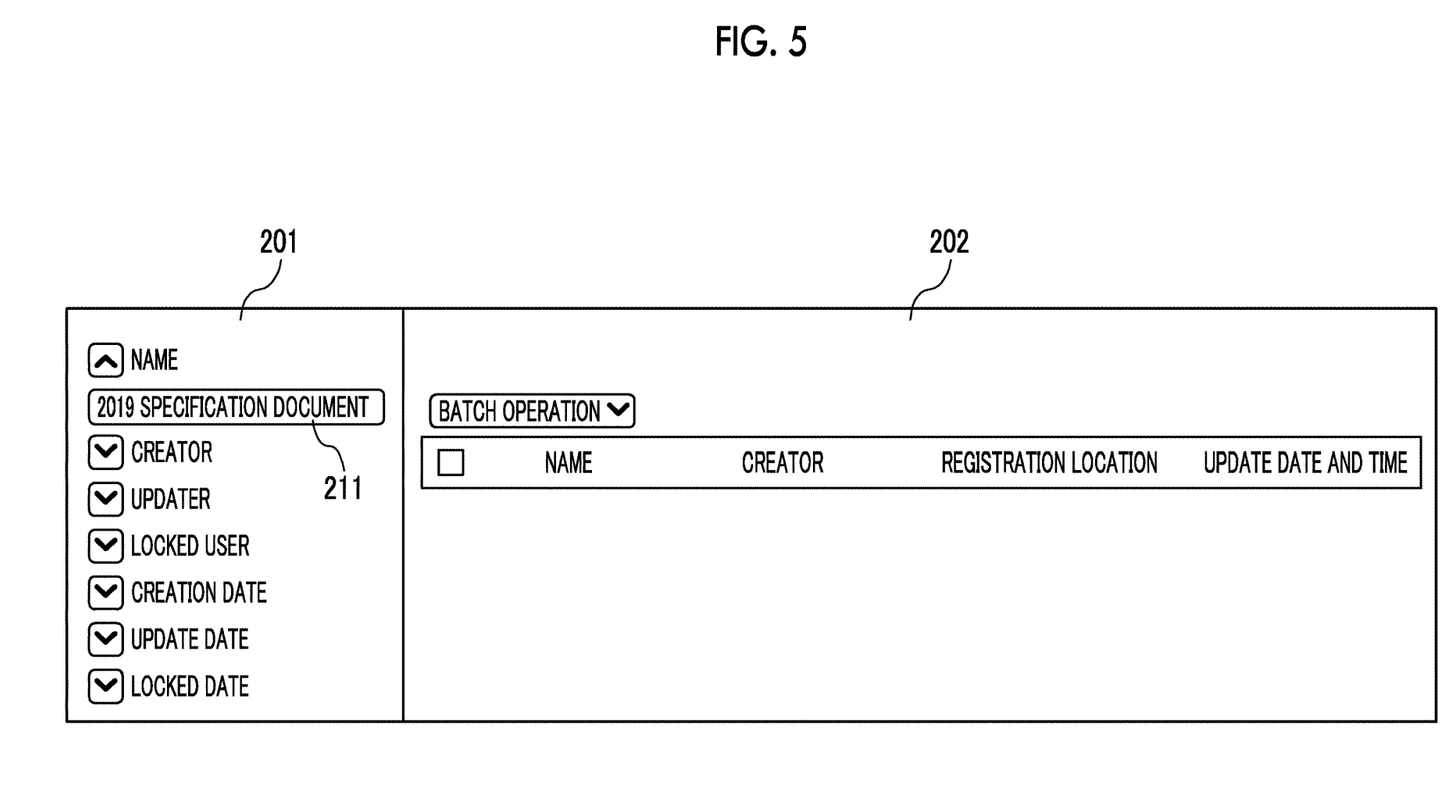
FIG. 5 is a diagram illustrating an example of a user interface presented on a user terminal.

FIG. 5 is a diagram illustrating an example of the user interface that is provided to the user terminal 20 by the search server 10 and displayed on the user terminal 20. The user interface displayed on the user terminal 20 includes a search condition input region 201 in which the user inputs the search condition, and a search result display region 202 in which the result of the search is displayed. The search condition input region 201 includes a search phrase input region 211 in which the user inputs the search phrase. In FIG. 5, a state where the user inputs the search phrase "2019 specification document" by designating a name (file name) in the attribute in order to search for the content is illustrated.

Figure 6:
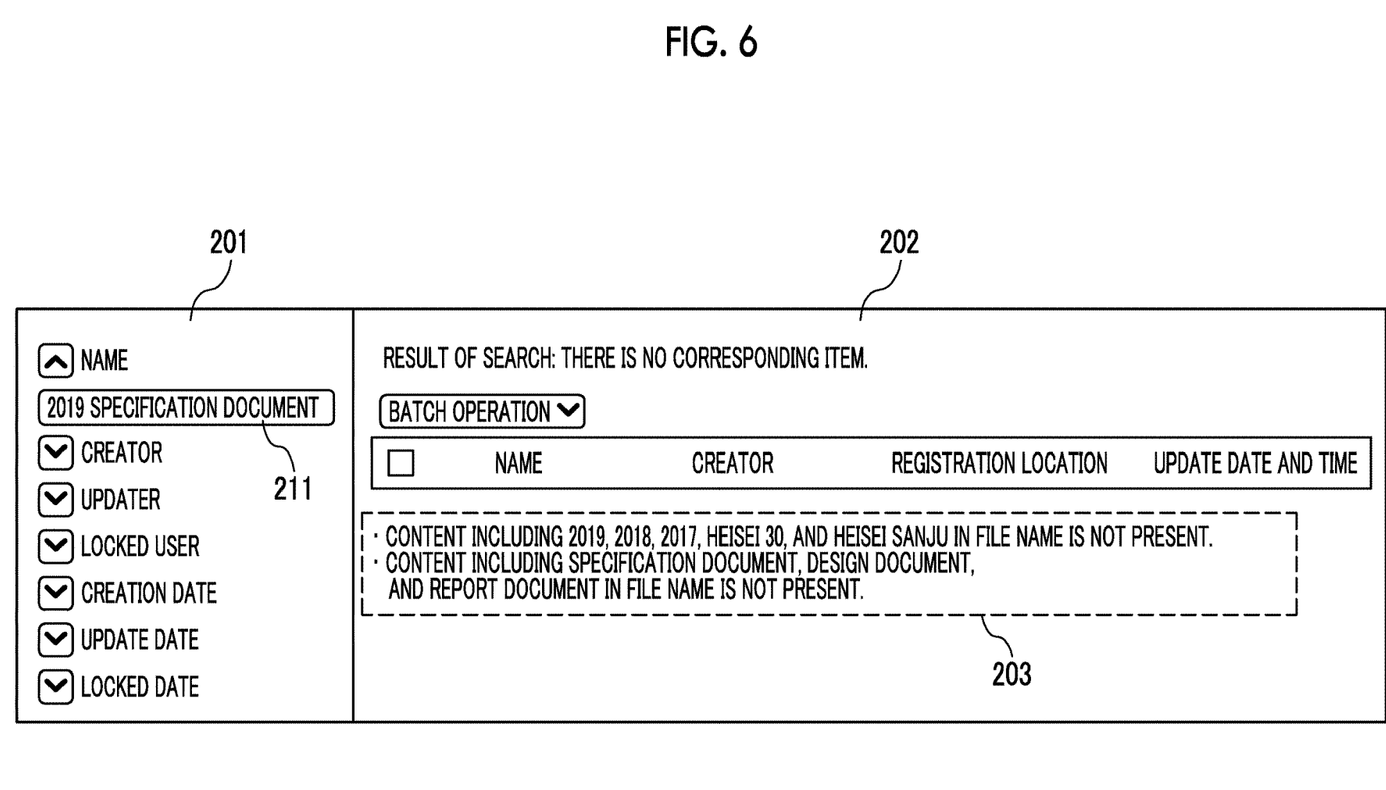
FIG. 6 is a diagram illustrating an example of the user interface presented on the user terminal.

FIG. 6 is a diagram illustrating an example of the user interface displayed on the user terminal 20. In FIG. 6, a display example in a case where the user inputs the search phrase "2019 specification document" by designating a name (file name) in the attribute is illustrated. Reference sign 203 denotes a reason display region for displaying a reason for the inability to find the content in a case where the content may not be found by the search processes based on the input condition and the prediction condition. In FIG. 6, the reason display region 203 shows that not only a content including "2019 specification document" in the file name but also a content including "2019", "2018", "2017", "Heisei 30", and "Heisei sanju" in the file name are not present in the search target. Furthermore, in FIG. 6, the reason display region 203 shows that a content including "specification document", "design document", and "report document" in the filename is not present in the search target.

By displaying not only the search phrase input by the user but also the result of the search performed using the phrases similar to the search phrase input by the user in the reason display region 203, the search server 10 may assist decision-making of the user related to continuing or stopping of the search of the content. The user who sees the reason displayed in the reason display region 203 may determine whether to continue searching by designating a condition other than the displayed condition or stop searching.

Figure 7:
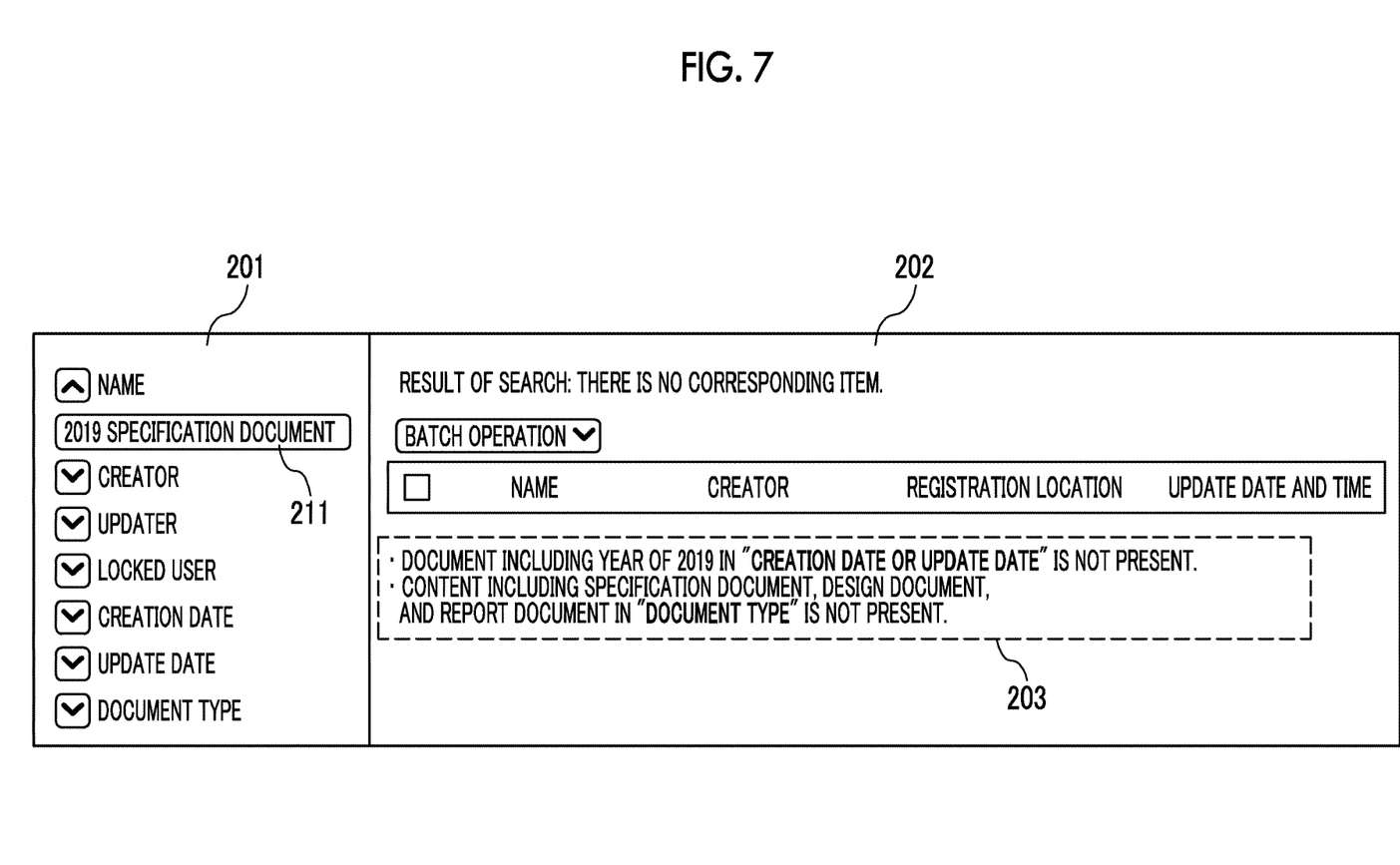
FIG. 7 is a diagram illustrating an example of the user interface presented on the user terminal.

FIG. 7 is a diagram illustrating an example of the user interface displayed on the user terminal 20. In FIG. 7, a display example in a case where the user inputs the search phrase "2019 specification document" by designating a name in the attribute is illustrated. In FIG. 7, the reason display region 203 shows that not only a content including "2019 specification document" in the file name but also a content of which the creation date or the update date is in 2019 are not present. Furthermore, in FIG. 7, the reason display region 203 shows that a content of a document type corresponding to not only "specification document" but also "design document" and "report document" is not present.

By displaying not only the search phrase input by the user but also the result of the search performed using the attributes predicted from the search phrase input by the user in the reason display region 203, the search server 10 may assist decision-making of the user related to continuing or stopping of the search of the content.

Figure 8:
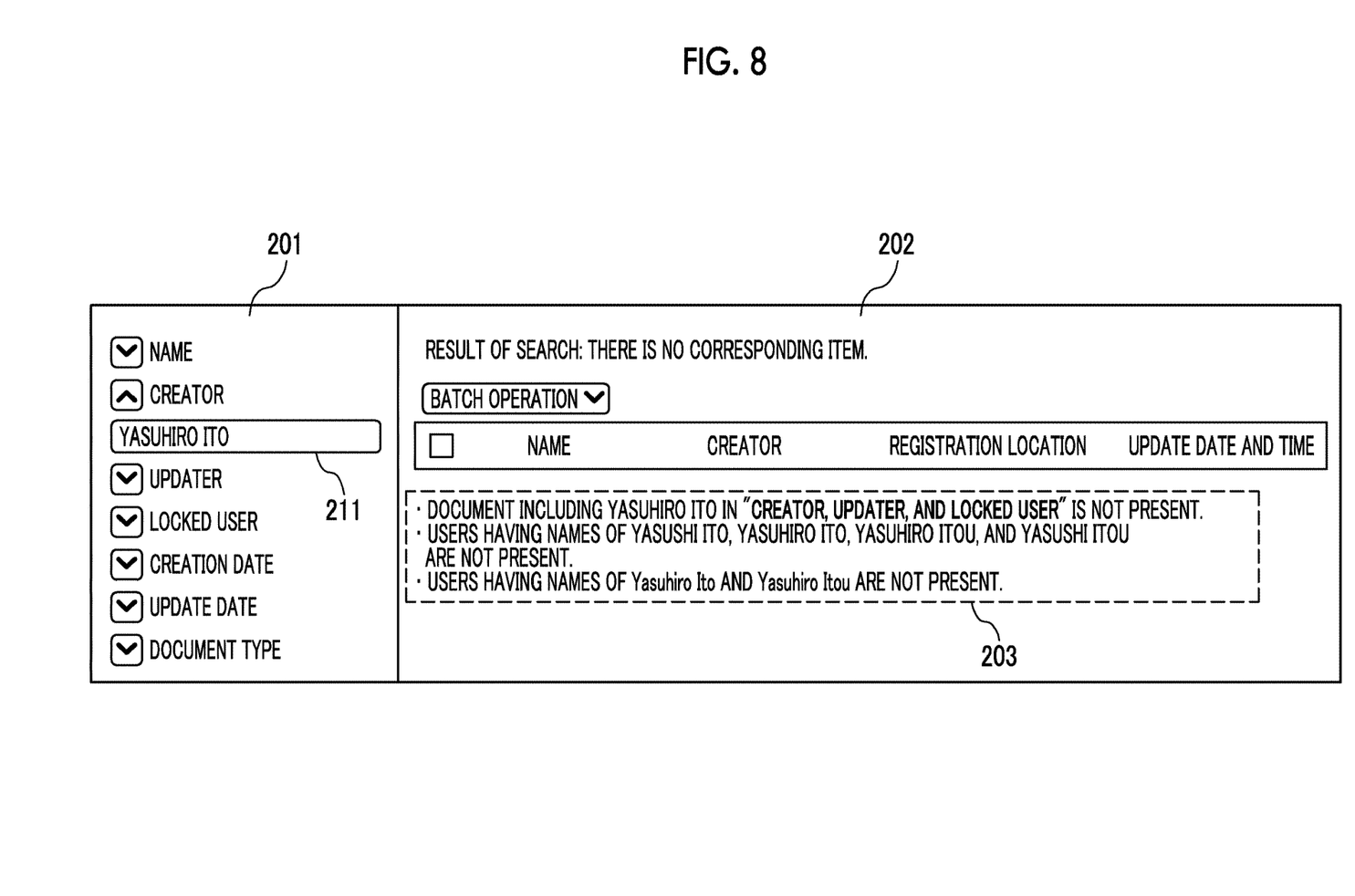
FIG. 8 is a diagram illustrating an example of the user interface presented on the user terminal.

FIG. 8 is a diagram illustrating an example of the user interface displayed on the user terminal 20. In FIG. 8, a display example in a case where the user inputs a search phrase "Yasuhiro Ito" by designating a creator in the attribute is illustrated. In FIG. 8, the reason display region 203 shows that a content of which not only the creator but also an updater or a locked user is "Yasuhiro Ito" is not present. In addition, in FIG. 8, the reason display region 203 shows that users "Yasushi Ito", "Yasuhiro Ito", "Yasuhiro Itou", and "Yasushi Itou" having similar names to "Yasuhiro Ito" are not registered as the user of the system in which the content of the search target is managed. In addition, in FIG. 8, the reason display region 203 shows that users "Yasuhiro Ito" and "Yasuhiro Itou" which are romaji representations of "Yasuhiro Ito" are not registered as the user of the system in which the content is managed.

Figure 9:
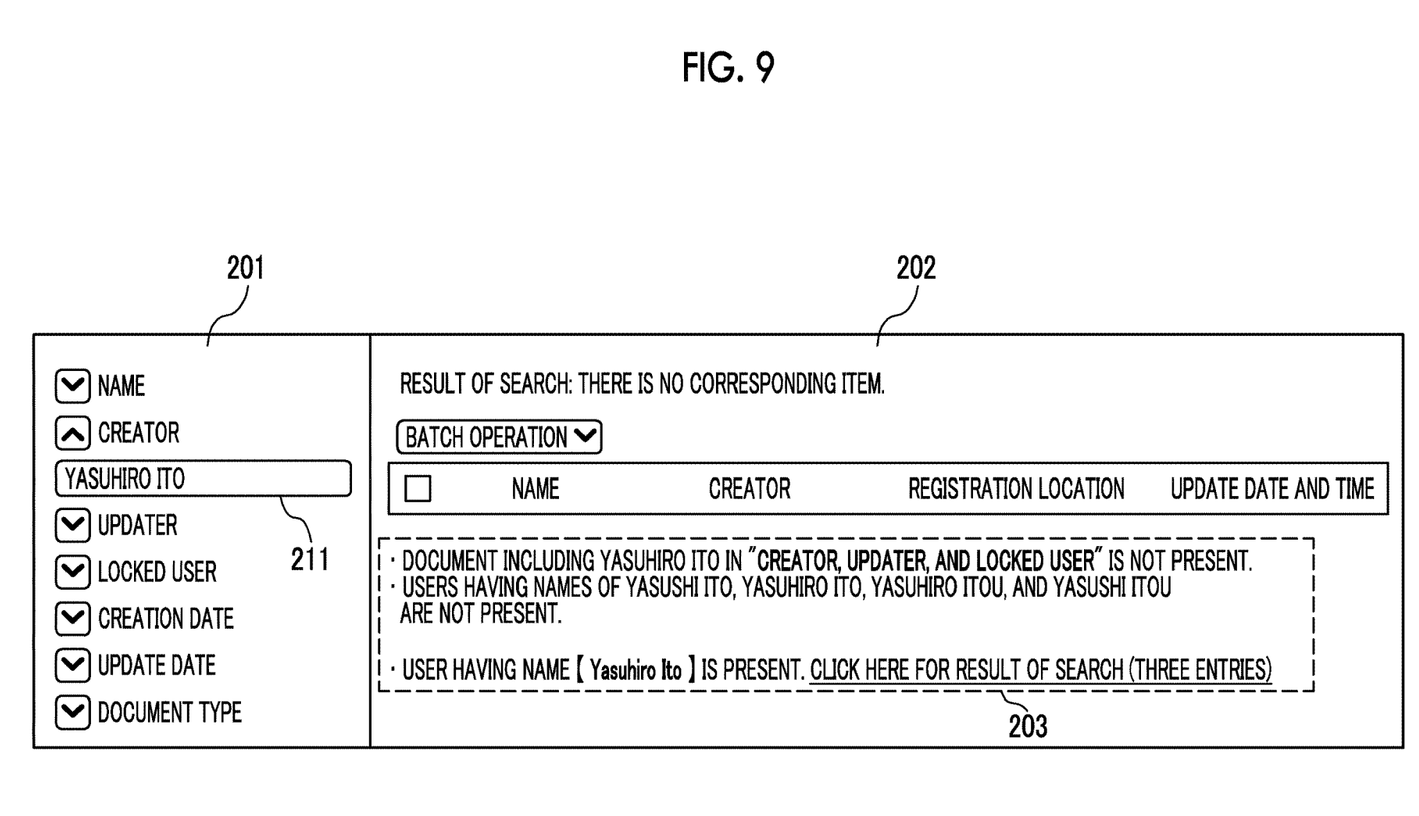
FIG. 9 is a diagram illustrating an example of the user interface presented on the user terminal.

FIG. 9 is a diagram illustrating an example of the user interface displayed on the user terminal 20. In FIG. 9, a display example in a case where the user inputs the search phrase "Yasuhiro Ito" by designating a creator in the attribute is illustrated. In FIG. 9, as in FIG. 8, the reason display region 203 shows that a content of which not only the creator but also the updater or the locked user is "Yasuhiro Ito" is not present. In addition, in FIG. 9, as in FIG. 8, the reason display region 203 shows that the users "Yasushi Ito", "Yasuhiro Ito", "Yasuhiro Itou", and "Yasushi Itou" having similar names to "Yasuhiro Ito" are not registered as the user of the system in which the content of the search target is managed.

Meanwhile, in FIG. 9, the reason display region 203 shows that the user "Yasuhiro Ito" which is a romaji representation of "Yasuhiro Ito" is registered as the user of the system in which the content is managed. Furthermore, in FIG. 9, the reason display region 203 shows information for presenting the result of the search performed using the user "Yasuhiro Ito". The information for presenting the result of the search may be a component such as a link or a button as illustrated in FIG. 9.

By displaying not only the search phrase input by the user but also the result obtained by comparison with the user of the system in which the content is managed in the reason display region 203, the search server 10 may assist decision-making of the user related to continuing or stopping of the search of the content.

The search server 10 according to this exemplary embodiment executes not only the search process under the input condition input by the user but also the search process under the prediction condition predicted based on the input condition. In the case of the search process under the prediction condition, the search server 10 according to this exemplary embodiment executes the search using an attribute different from the attribute designated by the user. In a case where the content may not be found even in the search using the attribute different from the attribute designated by the user, the search server 10 may not receive an input of the user with respect to the different attribute.

Figure 10:
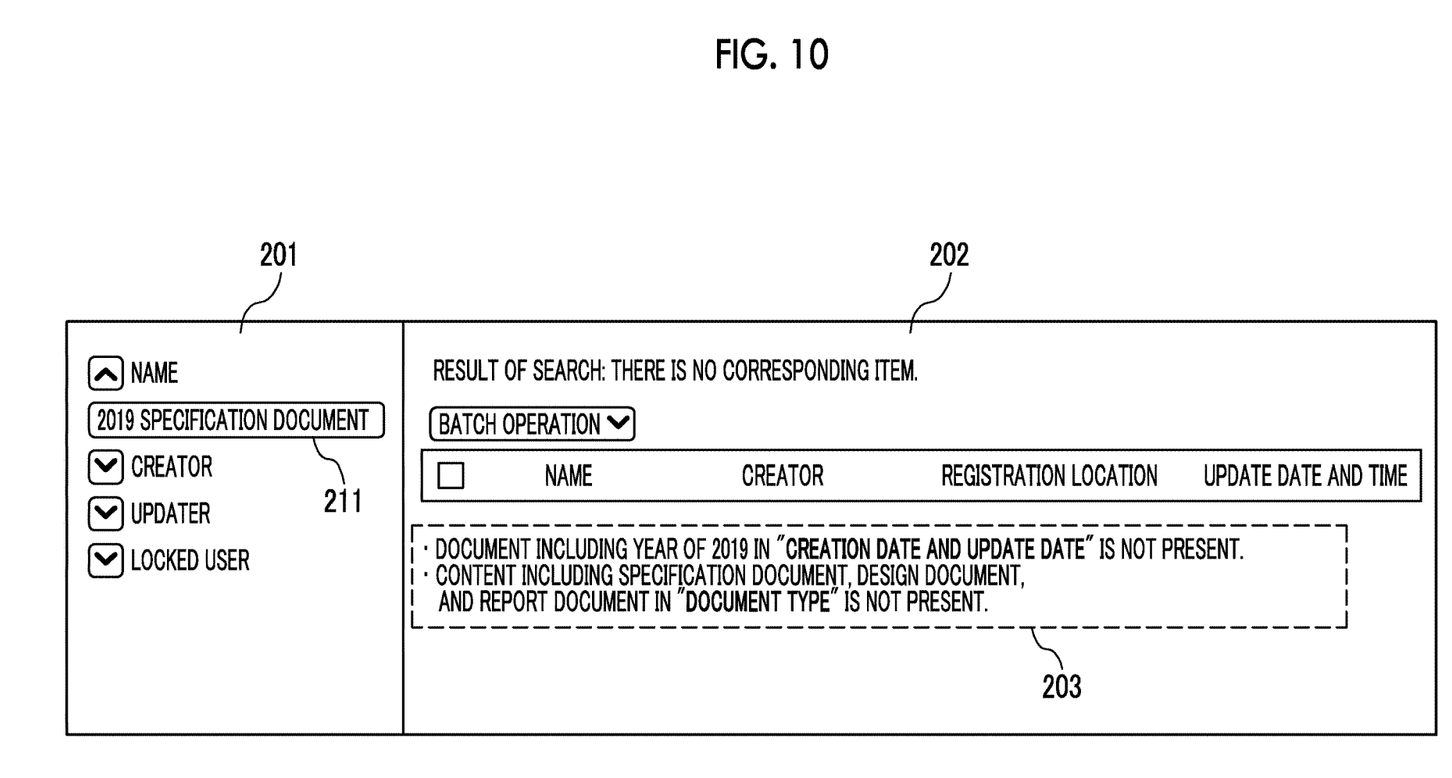
FIG. 10 is a diagram illustrating an example of the user interface presented on the user terminal.

FIG. 10 is a diagram illustrating an example of the user interface displayed on the user terminal 20. In FIG. 10, a display example in a case where the user inputs the search phrase "2019 specification document" by designating a name in the attribute is illustrated. In FIG. 10, the reason display region 203 shows that not only a content including "2019 specification document" in the file name but also a content of which the creation date or the update date is in 2019 are not present. Furthermore, in FIG. 10, the reason display region 203 shows that a content of a document type corresponding to not only "specification document" but also "design document" and "report document" is not present. In this case, the search server 10 may change display of the search condition input region 201 not to receive inputs in "creation date", "update date", and "document type". In FIG. 10, an example in which "creation date", "update date", and "document type" are not displayed is illustrated. In order not to receive inputs in "creation date", "update date", and "document type", the search server 10 may display these attributes in a different color such as gray from the other attributes and display the attributes such that inputs in the attributes are not received.

By controlling display of the search condition input region 201 in such a manner, the search server 10 according to this exemplary embodiment may assist decision-making of the user related to continuing or stopping of the search of the content.

In a case where the user deletes the search phrase, the search server 10 may control display to receive inputs again for the attributes of which display is controlled not to receive inputs. In this case, the search server 10 may control display to receive inputs again only in a case where the entire search phrase is deleted, or may control display to receive inputs again in a case where at least one text of the search phrase is deleted.

The content search process executed by causing the CPU to read software (program) in the exemplary embodiment may be executed by various processors other than the CPU. In this case, the processors are illustrated by a programmable logic device (PLD) such as a field-programmable gate array (FPGA) having a circuit configuration changeable after manufacturing, a dedicated electric circuit such as an application specific integrated circuit (ASIC) that is a processor having a circuit configuration dedicatedly designed to execute a specific process, and the like. In addition, the content search process may be executed by one of these various processors or may be executed by a combination of two or more processors of the same type or different types (for example, a plurality of FPGAs and a combination of a CPU and an FPGA). In addition, a hardware structure of these various processors is specifically an electric circuit into which circuit elements such as semiconductor elements are combined.

While an aspect in which the program for the content search process is prestored (installed) in the ROM or the storage is described in the exemplary embodiment, the present invention is not limited to the aspect. The program may be provided in the form of a recording on a recording medium such as a compact disk read only memory (CD-ROM), a digital versatile disk read only memory (DVD-ROM), and a universal serial bus (USB) memory. In addition, the program may be in the form of a download from an outside apparatus through a network.

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to
     receive a first search input by a user and acquire an input condition of the first search,
     search for a content based on the input condition,
     predict a condition of a second search to be input subsequently to the first search by the user, wherein the predicted condition is associated with the input condition,
     search for another content based on the predicted condition, and in response to the content not being found in the search based on the input condition, present details of the search of the another content based on the prediction condition.

2. The information processing apparatus according to claim 1,
wherein the processor is configured to present a reason that the content is not found as the details in response to the content not being found even in the search of the another content based on the prediction condition.

3. The information processing apparatus according to claim 2,
wherein the processor is configured to present information related to the input condition and the prediction condition under which the content is not found as the reason that the content is not found.

4. The information processing apparatus according to claim 3,
wherein the processor is configured to present information about a phrase and an attribute used in the search as the information.

5. The information processing apparatus according to claim 1,
wherein the processor is configured to, in response to the another content being found in the search of the another content based on the prediction condition, present information for presenting the found content as the details.

6. The information processing apparatus according to claim 5,
wherein the information for presenting the found content is a component for inquiring whether or not to present the found content.

7. The information processing apparatus according to claim 1,
wherein the prediction condition includes a phrase input as the input condition by the user and an attribute different from an attribute designated as the input condition by the user.

8. The information processing apparatus according to claim 1,
wherein the prediction condition includes a phrase similar to a phrase input as the input condition by the user and an attribute identical to an attribute designated as the input condition by the user.

9. The information processing apparatus according to claim 1,
wherein the prediction condition includes a phrase similar to a phrase input as the input condition by the user and an attribute different from an attribute designated as the input condition by the user.

10. The information processing apparatus according to claim 1,
wherein the prediction condition includes a phrase for an attribute that is predicted from a phrase input as the input condition by the user and is different from an attribute designated as the input condition by the user.

11. The information processing apparatus according to claim 10,
wherein the processor is configured to decide the phrase to be predicted in accordance with the attribute different from the attribute designated as the input condition by the user.

12. The information processing apparatus according to claim 1,
wherein the prediction condition is a phrase predicted from a search history of the user in the past.

13. The information processing apparatus according to claim 12,
wherein the prediction condition includes the phrase predicted from the search history of the user in the past and an attribute different from an attribute designated as the input condition by the user.

14. The information processing apparatus according to claim 1,
wherein the prediction condition is a phrase predicted from a search history of another user in the past.

15. The information processing apparatus according to claim 1,
wherein the processor is configured to, in response to the content not being found, control display not to receive an input of a condition from the user for an attribute that is used in the search and is different from an attribute designated by the user.

16. The information processing apparatus according to claim 15,
wherein the processor is configured not to display the attribute different from the attribute designated by the user.

17. The information processing apparatus according to claim 15,
wherein the processor is configured to, in a case where an operation of deleting a phrase input by the user is performed, control the display to enable reception of the input from the user for the attribute of which the input from the user is controlled not to be received.

18. A non-transitory computer readable medium storing a computer program causing a computer to execute a process, the process comprising:
receiving a first search input by a user and acquire an input condition of the first search;
searching for a content based on the input condition;
predicting a condition of a second search to be input subsequently to the first search by the user, wherein the predicted condition is associated with the input condition;
searching for another content based on the predicted condition; and
in response to the content not being found in the search based on the input condition, present details of the search of the another content based on the prediction condition.

19. The information processing apparatus according to claim 1,
wherein the input condition comprises a search phrase and an attribute, and
wherein the predicted condition comprises at least one related search phrase associated with the search phrase and at least one related attribute associated with the attribute.

20. The information processing apparatus according to claim 1,
wherein the processor is further configured to:
in response to the content not being found in the search based on the input condition and in response to the another content not being found in the search based on the prediction condition, present a reason that the content is not found and another reason that the another content is not found as the details.

* * * * *